(12) United States Patent
Ko et al.

(10) Patent No.: US 8,451,945 B2
(45) Date of Patent: May 28, 2013

(54) METHOD AND APPARATUS FOR TRANSMITTING DATA WITH TIME DIVERSITY AND/OR TIME-FREQUENCY DIVERSITY, AND PATTERN-GENERATING METHOD TO BE USED IN THE SAME

(75) Inventors: Hyun Soo Ko, Gyeonggi-do (KR); Bin Chul Ihm, Gyeonggi-do (KR); Jin Young Chun, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 784 days.

(21) Appl. No.: 12/373,515

(22) PCT Filed: Jul. 13, 2007

(86) PCT No.: PCT/KR2007/003359
§ 371 (c)(1),
(2), (4) Date: Nov. 11, 2009

(87) PCT Pub. No.: WO2008/007897
PCT Pub. Date: Jan. 17, 2008

(65) Prior Publication Data
US 2010/0074357 A1 Mar. 25, 2010

(30) Foreign Application Priority Data

Jul. 13, 2006 (KR) .................. 10-2006-0065799
Jan. 5, 2007 (KR) .................. 10-2007-0001352

(51) Int. Cl.
*H04L 27/00* (2006.01)

(52) U.S. Cl.
USPC ........... 375/299; 375/262; 375/265; 375/267; 375/295

(58) Field of Classification Search
USPC .......... 375/260, 267, 296, 297, 298; 327/291; 332/106; 341/20, 173
See application file for complete search history.

(56) References Cited

U.S. PATENT DOCUMENTS

| | | | | |
|---|---|---|---|---|
| 7,609,613 B2 * | 10/2009 | Aghvami et al. | ............. | 370/208 |
| 7,634,030 B2 * | 12/2009 | Kim et al. | ............. | 375/341 |
| 7,839,640 B2 * | 11/2010 | Hayashi et al. | ............. | 361/699 |
| 2005/0105629 A1 * | 5/2005 | Hottinen et al. | ............. | 375/261 |
| 2005/0249304 A1 * | 11/2005 | Takano et al. | ............. | 375/267 |
| 2007/0147543 A1 * | 6/2007 | Horng et al. | ............. | 375/299 |
| 2010/0014601 A1 * | 1/2010 | Mo et al. | ............. | 375/260 |

OTHER PUBLICATIONS

Zhang, et. al., "A new space-time-frequency MIMO-OFDM scheme with cyclic delay diversity" Proceedings of the IEEE: 6th Circuits and Systems Symposium on Emerging Technologies: Frontiers of Mobile and Wireless Communication, May 31, 2004. pp. 647-650.

Richter, G. et. al., "On Time-Varying Cyclic Delay Diversity", European Transactions on Telecommunications, vol. 17, issue 3; May 2006. pp. 361-370.

* cited by examiner

*Primary Examiner* — Dhaval Patel
(74) *Attorney, Agent, or Firm* — Lee, Hong, Degerman, Kang & Waimey

(57) ABSTRACT

A method and apparatus for transmitting data having time diversity and data having time-frequency diversity, and a pattern generating method for the same are disclosed. The apparatus enables Tx data to have time diversity or time frequency diversity using a predetermined pattern multiplied by Tx data of a time domain or Tx data of time and frequency domains. The apparatus makes a cyclic delay diversity (CDD) scheme to have the diversity of time and frequency domains, and may acquire an additional diversity gain by a combination of the above-mentioned methods.

9 Claims, 13 Drawing Sheets

FIG. 6

Antenna 1

Time axis →
frequency axis ↓

| $P_{1,1}S_0$ | $P_{1,2}S_4$ | $P_{1,3}S_8$ | ... |
|---|---|---|---|
| $P_{1,1}S_1$ | $P_{1,2}S_5$ | $P_{1,3}S_9$ | ... |
| $P_{1,1}S_2$ | $P_{1,2}S_6$ | $P_{1,3}S_{10}$ | ... |
| $P_{1,1}S_3$ | $P_{1,2}S_7$ | $P_{1,3}S_{11}$ | ... |
| ⋮ | ⋮ | ⋮ | ⋱ |

Antenna 2

Time axis →
frequency axis ↓

| $P_{2,1}S_0$ | $P_{2,2}S_4$ | $P_{2,3}S_8$ | ... |
|---|---|---|---|
| $P_{2,1}S_1$ | $P_{2,2}S_5$ | $P_{2,3}S_9$ | ... |
| $P_{2,1}S_2$ | $P_{2,2}S_6$ | $P_{2,3}S_{10}$ | ... |
| $P_{2,1}S_3$ | $P_{2,2}S_7$ | $P_{2,3}S_{11}$ | ... |
| ⋮ | ⋮ | ⋮ | ⋱ |

FIG. 7

Antenna 1

Time axis →
frequency axis ↓

| $P_{1,1,1}S_0$ | $P_{1,1,2}S_4$ | $P_{1,1,3}S_8$ | ... |
|---|---|---|---|
| $P_{1,2,1}S_1$ | $P_{1,2,2}S_5$ | $P_{1,2,3}S_9$ | ... |
| $P_{1,3,1}S_2$ | $P_{1,3,2}S_6$ | $P_{1,3,3}S_{10}$ | ... |
| $P_{1,4,1}S_3$ | $P_{1,4,2}S_7$ | $P_{1,4,3}S_{11}$ | ... |
| ⋮ | ⋮ | ⋮ | ⋱ |

Antenna 2

Time axis →
frequency axis ↓

| $P_{2,1,1}S_0$ | $P_{2,1,2}S_4$ | $P_{2,1,3}S_8$ | ... |
|---|---|---|---|
| $P_{2,2,1}S_1$ | $P_{2,2,2}S_5$ | $P_{2,2,3}S_9$ | ... |
| $P_{2,3,1}S_2$ | $P_{2,3,2}S_6$ | $P_{2,3,3}S_{10}$ | ... |
| $P_{2,4,1}S_3$ | $P_{2,4,2}S_7$ | $P_{2,4,3}S_{11}$ | ... |
| ⋮ | ⋮ | ⋮ | ⋱ |

FIG. 12

Antenna 1

Time axis →
frequency axis ↓

| $S_0$ | $S_4$ | $S_8$ | ... |
|---|---|---|---|
| $S_1$ | $S_5$ | $S_9$ | ... |
| $S_2$ | $S_6$ | $S_{10}$ | ... |
| $S_3$ | $S_7$ | $S_{11}$ | ... |
| ⋮ | ⋮ | ⋮ | ⋱ |

Antenna 2

Time axis →
frequency axis ↓

| $S_0$ | $S_4$ | $S_8$ | ... |
|---|---|---|---|
| $S_1 e^{j\theta}$ | $S_5 e^{j\theta}$ | $S_9 e^{j\theta}$ | ... |
| $S_2 e^{j2\theta}$ | $S_6 e^{j2\theta}$ | $S_{10} e^{j2\theta}$ | ... |
| $S_3 e^{j3\theta}$ | $S_7 e^{j3\theta}$ | $S_{11} e^{j3\theta}$ | ... |
| ⋮ | ⋮ | ⋮ | ⋱ |

FIG. 14

Antenna 1 frequency axis | Time axis →

| $P_0 S_{01}$ | $P_1 S_{11}$ | $P_2 S_{21}$ | $P_3 S_{31}$ | $\cdots$ | $P_k S_{k1}$ |
|---|---|---|---|---|---|
| $P_0 S_{02}$ | $P_1 S_{12}$ | $P_2 S_{22}$ | $P_3 S_{32}$ | $\cdots$ | $P_k S_{k2}$ |
| $P_0 S_{03}$ | $P_1 S_{13}$ | $P_2 S_{23}$ | $P_3 S_{33}$ | $\cdots$ | $P_k S_{k3}$ |
| $\vdots$ | $\vdots$ | $\vdots$ | $\vdots$ | $\cdots$ | $\vdots$ |
| $P_0 S_{0m}$ | $P_1 S_{1m}$ | $P_2 S_{2m}$ | $P_3 S_{3m}$ | | $P_k S_{km}$ |

Antenna 2 frequency axis | Time axis →

| $P_0 S_{01}$ | $P_1 S_{11}$ | $P_2 S_{21}$ | $P_3 S_{31}$ | $\cdots$ | $P_k S_{k1}$ |
|---|---|---|---|---|---|
| $P_0 S_{02} e^{j\theta}$ | $P_1 S_{12} e^{j\theta}$ | $P_2 S_{22} e^{j\theta}$ | $P_3 S_{32} e^{j\theta}$ | $\cdots$ | $P_k S_{k2} e^{j\theta}$ |
| $P_0 S_{03} e^{j2\theta}$ | $P_1 S_{13} e^{j2\theta}$ | $P_2 S_{23} e^{j2\theta}$ | $P_3 S_{33} e^{j2\theta}$ | $\cdots$ | $P_k S_{k3} e^{j2\theta}$ |
| $\vdots$ | $\vdots$ | $\vdots$ | $\vdots$ | $\cdots$ | $\vdots$ |
| $P_0 S_{0m} e^{jm\theta}$ | $P_1 S_{1m} e^{jm\theta}$ | $P_2 S_{2m} e^{jm\theta}$ | $P_3 S_{3m} e^{jm\theta}$ | | $P_k S_{km} e^{jm\theta}$ |

FIG. 15

Antenna 1 frequency axis | Time axis →

| $S_0$ | $S_4$ | $S_8$ | ... |
|---|---|---|---|
| $S_1$ | $S_5$ | $S_9$ | ... |
| $S_2$ | $S_6$ | $S_{10}$ | ... |
| $S_3$ | $S_7$ | $S_{11}$ | ... |
| ⋮ | ⋮ | ⋮ | ⋱ |

Antenna 2 frequency axis | Time axis →

| $S_0$ | $S_4 e^{j\theta}$ | $S_8 e^{j2\theta}$ | ... |
|---|---|---|---|
| $S_1$ | $S_5 e^{j\theta}$ | $S_9 e^{j2\theta}$ | ... |
| $S_2$ | $S_6 e^{j\theta}$ | $S_{10} e^{j2\theta}$ | ... |
| $S_3$ | $S_7 e^{j\theta}$ | $S_{11} e^{j2\theta}$ | ... |
| ⋮ | ⋮ | ⋮ | ⋱ |

FIG. 16

Antenna 1 frequency axis ↓    Time axis →

| $P_{0,0,0}\, e^{j\theta^{0,0,0}} S_0$ | $P_{0,0,1}\, e^{j\theta^{0,0,1}} S_4$ | $P_{0,0,2}\, e^{j\theta^{0,0,2}} S_8$ | ... |
|---|---|---|---|
| $P_{0,1,0}\, e^{j\theta^{0,1,0}} S_1$ | $P_{0,1,1}\, e^{j\theta^{0,1,1}} S_5$ | $P_{0,1,2}\, e^{j\theta^{0,1,2}} S_9$ | ... |
| $P_{0,2,0}\, e^{j\theta^{0,2,0}} S_2$ | $P_{0,2,1}\, e^{j\theta^{0,2,1}} S_6$ | $P_{0,2,2}\, e^{j\theta^{0,2,2}} S_{10}$ | ... |
| $P_{0,3,0}\, e^{j\theta^{0,3,0}} S_3$ | $P_{0,3,1}\, e^{j\theta^{0,3,1}} S_7$ | $P_{0,3,2}\, e^{j\theta^{0,3,2}} S_{11}$ | ... |
| ⋮ | ⋮ | ⋮ | |

Antenna 2 frequency axis ↓    Time axis →

| $P_{1,0,0}\, e^{j\theta^{1,0,0}} S_0$ | $P_{1,0,1}\, e^{j\theta^{1,0,1}} S_4$ | $P_{1,0,2}\, e^{j\theta^{1,0,2}} S_8$ | ... |
|---|---|---|---|
| $P_{1,1,0}\, e^{j\theta^{1,1,0}} S_1$ | $P_{1,1,1}\, e^{j\theta^{1,1,1}} S_5$ | $P_{1,1,2}\, e^{j\theta^{1,1,2}} S_9$ | ... |
| $P_{1,2,0}\, e^{j\theta^{1,2,0}} S_2$ | $P_{1,2,1}\, e^{j\theta^{1,2,1}} S_6$ | $P_{1,2,2}\, e^{j\theta^{1,2,2}} S_{10}$ | ... |
| $P_{1,3,0}\, e^{j\theta^{1,3,0}} S_3$ | $P_{1,3,1}\, e^{j\theta^{1,3,1}} S_7$ | $P_{1,3,2}\, e^{j\theta^{1,3,2}} S_{11}$ | ... |
| ⋮ | ⋮ | ⋮ | |

METHOD AND APPARATUS FOR TRANSMITTING DATA WITH TIME DIVERSITY AND/OR TIME-FREQUENCY DIVERSITY, AND PATTERN-GENERATING METHOD TO BE USED IN THE SAME

CROSS-REFERENCE TO RELATED APPLICATIONS

This application is the National Stage filing under 35 U.S.C. §371 of International Application No. PCT/KR2007/003359, filed on Jul. 11, 2007, which claims the benefit of earlier filing date and right of priority to Korean Application No. 10-2007-0001352, filed on Jan. 5, 2007 and Korean Application No. 10-2006-0065799, filed on Jul. 13, 2006.

TECHNICAL FIELD

The present invention relates to a diversity technique for use in a wireless communication system, and more particularly to a method and apparatus for transmitting transmission (Tx) data having either time diversity or time-frequency diversity.

BACKGROUND ART

With the widespread of information communication services, the introduction of various multimedia services and high-quality services, the demand of communication services is rapidly increasing. In order to actively cope with the above-mentioned situation, capacity of a communication system must be greatly increased.

The above-mentioned requirements are more significant in a wireless communication technical field than in a wired communication technical field, because the available frequency resources of the wireless communication field are limited and must be shared with each other to effectively employ the limited frequency resources. In addition, the demands of the wireless communication technology are rapidly increasing due to the advantages of the wireless communication technology.

In recent times, Space Time Coding (STC) techniques have been proposed to improve the efficiency of radio resources. The STC technique mounts a plurality of antennas to a transceiver (i.e., a transmission/reception unit) to acquire an additional spatial area for employing resources, increases communication-link reliability based on a diversity gain without increasing a bandwidth, or increases transmission (Tx) capacity via parallel transmission based on spatial multiplexing.

A basic system capable of increasing the transmission capacity or acquiring the diversity gain will hereinafter be described in detail.

FIG. 1 is a block diagram illustrating an orthogonal frequency division multiplexing system including a single transmission/reception antenna.

FIG. 2 is a block diagram illustrating the OFDM system including a multiple Tx/Rx (i.e., transmission/reception) antennas.

Referring to FIG. 1, a transmission end of the OFDM system including a single Tx/Rx antenna includes a channel encoder 101, a mapper 102, and a serial-to-parallel (S/P) converter 103. Referring to FIG. 2, a transmission end of the OFDM system including multiple Tx/Rx antennas includes a channel encoder 101', a mapper 102', and a serial-to-parallel (S/P) converter 103'.

Referring to FIG. 1, a reception end of the OFDM system includes a parallel-to-serial (P/S) converter 106, a demapper 107, a channel decoder 108, and a data estimator 109. Referring to FIG. 2, a reception end of the OFDM system includes a parallel-to-serial (P/S) converter 106', a demapper 107', a channel decoder 108', and a data estimator 109'.

If the system is a multi-antenna system, the above-mentioned transmission end further includes a multi-antenna encoder 104', and the above-mentioned reception end further includes a multi-antenna decoder 105'.

The channel encoder 101 or 101' attaches a redundant bit to a data bit to reduce the channel effect or the noise effect. The mapper 102 or 102' converts data bit information into data symbol information. The S/P converter 103 or 103' converts serial data into parallel data.

In the meantime, the multi-antenna encoder 104' converts a data symbol into a space-time signal. In the case of a multi-antenna, a transmission (Tx) antenna transmits the space-time signal over a channel.

In this case, the multi-antenna decoder 104' transmits the same signal over the multi-antenna to acquire a diversity gain. In order to increase a transfer rate, the multi-antenna encoder 104' transmits different signals over individual multiple antennas.

In the meantime, the reception (Rx) antenna receives a signal over a channel. Also, the multi-antenna decoder 105' converts the received space-time signal into each data symbol. The demapper 107 or 107' converts the data symbol into bit information. The P/S converter 106 or 106' converts the parallel signal into the serial signal. Finally, the channel decoder 108 or 108' decodes the channel code, and performs channel estimation.

The OFDM system including the above-mentioned transmission/reception unit employs the STC technique for use in a multi-antenna system to acquire the diversity gain. In more detail, the STC technique is a technique for acquiring the spatial diversity gain by re-transmitting the same signal over other antennas, when continuously transmitting the same signal under the multi-antenna environment. The following equation 1 indicating the most principal space-time code (STC) is applied to the system including two Tx antennas.

$$\frac{1}{\sqrt{2}}\begin{bmatrix} S_1 & -S_2^* \\ S_2 & S_1^* \end{bmatrix} \qquad \text{[Equation 1]}$$

In Equation 1, two rows indicate data transmitted over two antennas, respectively, and two columns indicate data transmitted over individual antennas during each time slot. In the case of using the above-mentioned STC technique, the OFDM system can acquire a high space-time diversity gain. However, as shown in Equation 1, the receiver for receiving data requires a data combiner for combining first data received from a first antenna with second data received from a second antenna, and a data detector for detecting original data via the data combiner, such that the receiver may be unavoidably complicated.

In the meantime, a Cyclic Delay Diversity (CDD) technique has been proposed to solve the problems of the above-mentioned STC technique. However, the CDD technique can acquire only the diversity based on channel characteristics of a frequency axis.

Therefore, there is needed an improved data communication technique for transmitting/receiving data with time-diversity or data with time-frequency diversity using a simple receiver.

DISCLOSURE

Technical Problem

Accordingly, the present invention is directed to a method and apparatus for transmitting data with time diversity and/or data with time-frequency diversity, and a pattern generation method for use in the same, that substantially obviate one or more problems due to limitations and disadvantages of the related art.

An object of the present invention is to provide a pattern generation method, and a method and apparatus for transmitting data using the same, for receiving data with time-diversity using a simple receiver.

Another object of the present invention is to provide a method for generating a pattern, and a method and apparatus for transmitting data using the same, to transmit data not only with frequency diversity according to cyclic delay diversity (CDD) technique, also with time diversity.

Yet another object of the present invention is to provide a method and apparatus for acquiring time-frequency diversity by generating a pattern capable of giving time diversity to Tx data in not only a time domain but also in a frequency domain, and a method and apparatus for making a cyclic delay diversity (CDD) technique to have diversity in both frequency- and time-areas.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a method for transmitting data in a wireless communication multi-antenna system comprising: a) generating time-axis patterns for varying time-axis channel characteristics of transmission signals of each multi-antennas; b) multiplying sequential signals contained in the time-axis patterns by time-axis sequential data of the transmission signals of the multi-antennas, and generating a data stream having time diversity; and c) transmitting the generated data stream.

Preferably, the method further comprises: processing the data stream having the time diversity to have different phase delays in a frequency domain, and generating a data stream having time and frequency diversities (i.e., time-frequency diversity).

Preferably, when extracting patterns from the patterns for varying the time-axis channel characteristics, and when the extracted patterns have an maximum even length equal to or less than a length of the patterns, the extracted patterns are composed of orthogonal codes orthogonal to each other.

Preferably, the patterns for varying the time-axis channel characteristics are a Walsh code, and the number of the Walsh codes corresponds to the number of multi-antennas.

Preferably, the patterns for varying the time-axis channel characteristics are 1, 1, 1, 1, ... and 1, −1, 1, −1 ... when the number of multi-antennas is 2.

Preferably, the patterns for varying the time-axis channel characteristics are selected to have a ratio according to a transmission power ratio assigned to each of the multi-antennas, at every transmission time unit.

In another aspect of the present invention, there is provided a method for transmitting data in a wireless communication multi-antenna system comprising: a) generating time and frequency-axes patterns for varying time and frequency-axes channel characteristics of transmission signals of each multi-antennas; b) mapping the time and frequency-axes patterns to time and frequency-axes data of the transmission signals of the multi-antennas, multiplying the time and frequency-axes patterns by the time and frequency-axes data, and generating a data stream having time and frequency diversities (i.e., time-frequency diversity); and c) transmitting the generated data stream.

Preferably, the patterns for varying the time and frequency-axis channel characteristics are selected to have ratios according to a transmission power ratio assigned to each of the multi-antennas, a transmission power ration assigned to each of data to be transmitted through frequency axis, at every transmission time unit.

Preferably, the norm value of the patterns for varying the time and frequency-axes channel characteristics in specific frequency resource units is 1.

Preferably, the method further comprises: processing the data stream having the time-frequency diversity generated by the step b) to have different phase delays in a frequency domain, and generating a data stream having an additional frequency diversity.

Preferably, the method further comprises: multiplying an exponential function having a specific exponent by the data stream having the time-frequency diversity, and generating a data stream having an additional time diversity, in which the specific exponent is proportional to time and has no connection with a frequency.

In yet another aspect of the present invention, there is provided a method for transmitting data in a wireless communication multi-antenna system comprising: a) processing a data stream transmitted over each multi-antenna to have different phase delays in a frequency domain; b) multiplying the processed data stream by an exponential function having a specific exponent which is proportional to time and has no connection with a frequency; and c) transmitting the multiplied data stream.

In yet another aspect of the present invention, there is provided a method for generating a pattern used to generate a data stream having time diversity in a wireless communication system which transmits data in units of a data stream having a predetermined time-axis length over a multi-antenna, the method comprising: receiving the time-axis length of the data stream and the number of the multi-antennas; and generating patterns, which have the length equal to the time-axis length of the data stream and which include code signals, the number if code signals is same to the number of the antennas, wherein when extracting patterns from the generated patterns, and when the extracted patterns has an maximum even length equal to or less than a length of the patterns, the extracted patterns are composed of orthogonal codes orthogonal to each other.

In yet another aspect of the present invention, there is provided a method for transmitting data using a transmission end of a communication system comprising: a) setting transmission power ratios of each multi-antenna to have different transmission power ratios at every transmission time units; and b) multiplying weights assigned to the each multi-antenna to have the transmission power ratios by transmission data of the each multi-antenna at every transmission time units, and transmitting the multiplied result.

Preferably, the method further comprises: c) receiving, by the transmission end, feedback information indicating a channel status from a reception end, before performing the step a); and wherein during the step a), setting the each transmission power ratios of the each multi-antenna according to the channel status information received from the reception end.

In yet another aspect of the present invention, there is provided a method for generating a pattern used to generate a data stream having time-frequency diversity in a wireless communication system which transmits data in units of a data stream having a predetermined time-axis length and frequency axis length over a multi-antenna, the method comprising: receiving the time-axis length and the frequency-axis length of the predetermined-length data stream, and the number of the multi-antennas; and generating patterns, which have a time axis length and frequency axis length equal to the time-axis length and frequency-axis length of the data stream, and which include code signals, the number of code signals is same to the number of the antennas, and which vary time and frequency-axes channel characteristics of the data stream.

In yet another aspect of the present invention, there is provided an apparatus for transmitting data in a wireless communication multi-antenna system comprising: a pattern generator for generating patterns to vary time-axis channel characteristics of transmission signals of each multi-antenna; a multiplier for multiplying sequential signals of the patterns generated by the pattern generator by time-axis sequential data of the transmission signals of each multi-antenna, and generating a data stream having time diversity; and a transmitter for transmitting the generated data stream.

Preferably, the apparatus further comprises: a delay unit for processing the data stream having the time diversity from the multiplier to have different phase delays in a frequency domain, thereby generating a data stream having time-frequency diversity.

In yet another aspect of the present invention, there is provided an apparatus for transmitting data in a wireless communication multi-antenna system comprising: a pattern generator for generating time and frequency-axes patterns to vary time and frequency-axes channel characteristics of the transmission signals of each multi-antenna; a multiplier for mapping the time and frequency-axes patterns to time and frequency-axes data of the transmission signals of the multi-antennas, multiplying the time and frequency-axes patterns by the time and frequency-axes data, and generating a data stream having time-frequency diversity; and a transmitter for transmitting the data stream generated by the multiplier.

In yet another aspect of the present invention, there is provided an apparatus for transmitting data in a wireless communication multi-antenna system comprising: a delay unit for processing the data stream of each multi-antenna to have different phase delays in a frequency domain; a multiplier for multiplying the data stream by an exponential function having a specific exponent, which is proportional to time and has no connection with a frequency; and a transmitter for transmitting the multiplied data stream.

It is to be understood that both the foregoing general description and the following detailed description of the present invention are exemplary and explanatory and are intended to provide further explanation of the invention as claimed.

Advantageous Effects

The present invention make it possible to transmit data having time diversity using a system including a simple receiver structure.

Also, the present invention make it possible to transmit data not only with frequency diversity according to cyclic delay diversity (CDD) technique, also with time diversity.

Yet also, the present invention make it possible to acquire time-frequency diversity by generating a pattern capable of giving time diversity to Tx data in not only a time domain but also in a frequency domain, and make a cyclic delay diversity (CDD) technique to have diversity in both frequency- and time-areas.

By doing the above and combination thereof, the present invention make it possible to decrease an error rate of the reception end.

DESCRIPTION OF DRAWINGS

The accompanying drawings, which are included to provide a further understanding of the invention, illustrate embodiments of the invention and together with the description serve to explain the principle of the invention.

In the drawings:

FIG. 6 is a conceptual diagram illustrating a data structure having time diversity via a power-ratio pattern in a wireless communication multi-antenna system according to another preferred embodiment of the present invention;

FIG. 7 is a conceptual diagram illustrating a data structure having time and frequency diversities via a power-ratio pattern in a wireless communication multi-antenna system according to a still another preferred embodiment of the present invention;

FIG. 12 is a structural diagram illustrating a data structure transmitted according to the CDD technique shown in FIG. 11 according to the present invention;

FIG. 14 is a structural diagram illustrating transmission (Tx) data based on a pattern for assigning time diversity and other Tx data based on a CDD technique according to the present invention;

FIG. 15 is a structural diagram illustrating a data structure based on a CDD technique to assign diversity in a time-axis direction according to the present invention; and FIG. 16 is a conceptual diagram illustrating a method for simultaneously applying a pattern variation method based on a power ratio and a CDD technique capable of assigning time-frequency diversity according to the present invention.

BEST MODE

Reference will now be made in detail to the preferred embodiments of the present invention, examples of which are illustrated in the accompanying drawings. Wherever possible, the same reference indexes will be used throughout the drawings to refer to the same or like parts.

Figure 3:
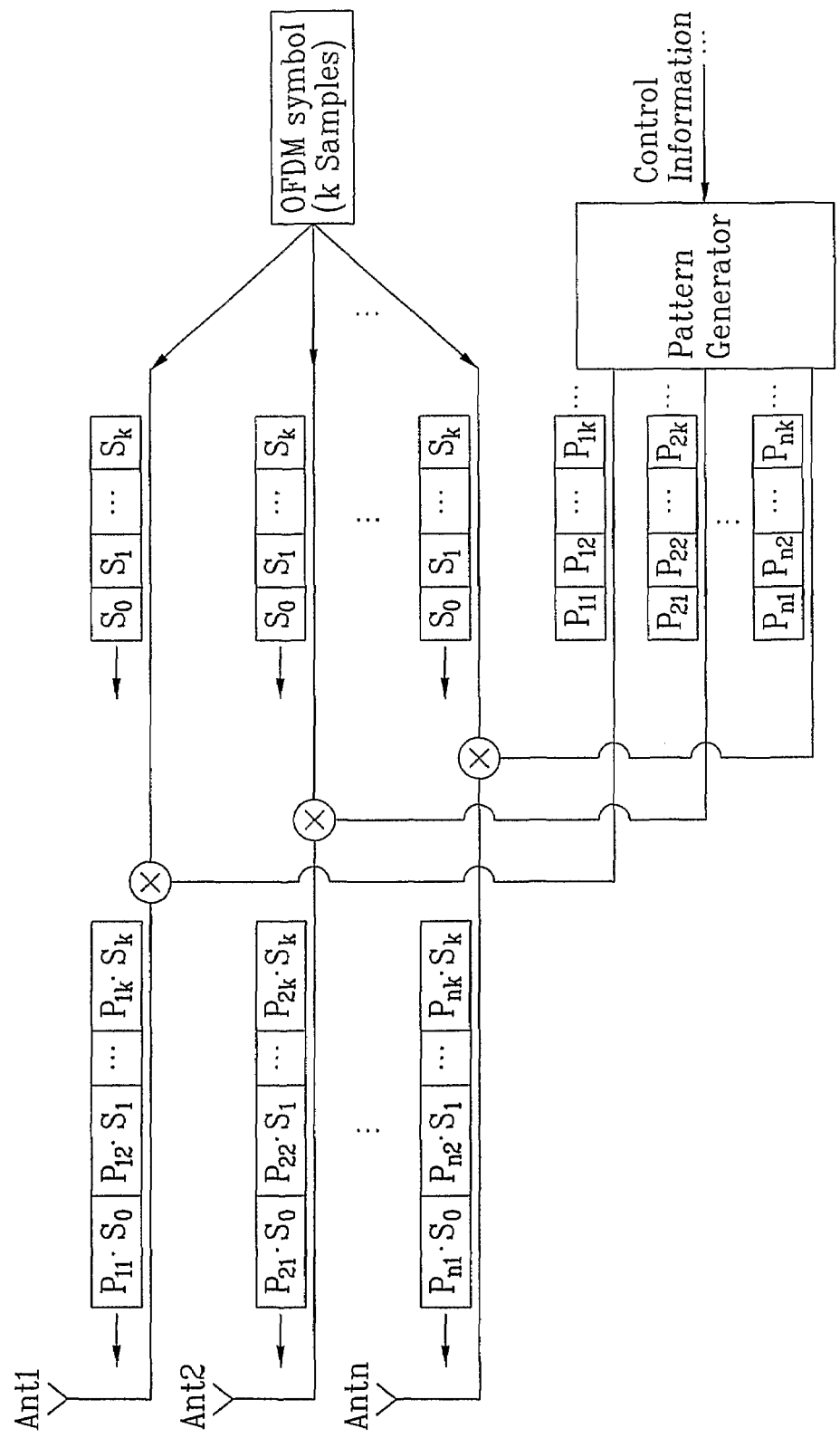
FIG. 3 is a conceptual diagram illustrating an apparatus for transmitting data with time diversity using a predetermined pattern in a wireless communication multi-antenna system according to a preferred embodiment of the present invention.

FIG. 3 is a conceptual diagram illustrating an apparatus for transmitting data with time diversity using a predetermined pattern in a wireless communication multi-antenna system according to a preferred embodiment of the present invention.

Referring to FIG. 3, in order to transmit data having time diversity, the wireless communication multi-antenna system generates patterns ($P_{ij}$, where $1 \leq i \leq n$, and $1 \leq j \leq k$) capable of varying time-axis channel characteristics of Tx signals ($S_j$, where $1 \leq j \leq k$) of each multi-antenna.

In this case, the above-mentioned patterns ($P_{ij}$) varying the time-axis channel characteristics reduce a correlation of data to be transmitted on a time axis, as shown in FIG. 3. In other words, the patterns ($P_{ij}$) change a channel response between two symbols adjacent to each other on a time axis.

Each pattern ($P_{ij}$) for varying the time-axis channel characteristics may be composed of a code signal, the length of which corresponds to the length of a data stream to be transmitted and the number of Tx antennas, or may be weights based on a Tx power ratio of Tx data transmitted over each multi-antenna. A detailed description of the above-mentioned patterns will be described later with reference to FIG. 4.

The sequential signals contained in each pattern ($P_{ij}$) are multiplied by sequential data ($S_j$) in a time-axis direction of signals to be transmitted over multi-antennas, respectively, such that data streams $P_{ij}*S_j$ ($P_{ij} \cdot S_j$) are created.

The above-mentioned data streams $P_{ij} \cdot S_j$ have reduced correlation between neighboring symbols on a time axis according to pattern values. That is, the data streams received in the reception end have different channel responses in a time-axis direction, so the data streams, $P_{ij} \cdot S_j$, can be thought that they have time diversity. Thereafter, the data streams having the time diversity are transmitted over multiple antennas Ant 1~Ant n.

Generally, the time diversity can be classified into narrow-sense time diversity and broad-sense time diversity.

According to the narrow-sense time diversity, the same data is transmitted over a plurality of antennas at intervals of a predetermined period of time, and a reception end receives two same data received at intervals of the predetermined period of time, such that the received data can be estimated with high reliability by the narrow-sense time diversity.

On the other hand, the broad-sense time diversity comprises a meaning of reducing a correlation between two Tx data on the time axis, thereby making the transmitted data to have tolerance to a burst error. It can be recognized that the data streams shown in FIG. 3 have the broad-sense time diversity.

For the convenience of description and better understanding of the present invention, it should be noted that the term "time diversity" according to the present invention indicates the above-mentioned broad-sense time diversity.

Figure 4:
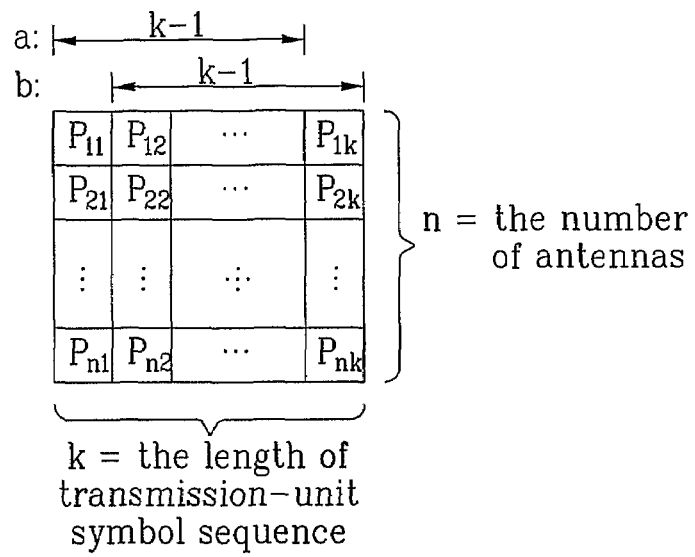
FIG. 4 is a conceptual diagram illustrating a pattern structure for generating a data stream having time diversity according to a preferred embodiment of the present invention.

FIG. 4 is a conceptual diagram illustrating a pattern structure for generating a data stream having time diversity according to a preferred embodiment of the present invention.

Referring to FIG. 4, provided that the length of a unit symbol sequence of a system for transmitting data in units of a predetermined symbol sequence is set to "K", and the number of antennas is set to "N", the patterns for varying time-axis channel characteristics of Tx data may be composed of (N×K) patterns.

If the K value in the (N×K) patterns is an even number, N patterns composed of code signals having the K length may be orthogonal to each other so as to reduce a correlation between Tx data units on a time axis.

If the K value is an odd number, N patterns composed of code signals having the K length may not be orthogonal to each other.

Therefore, as for the pattern for generating data having time diversity according to a preferred embodiment of the present invention, if patterns having the length of (K−1) are extracted from among the patterns having the K length (e.g., "a" or "b" in the FIG. 4), the extracted N patterns having the (K−1) length are orthogonal to each other.

In this case, the reference character "a" and "b" (See FIG. 4) for extracting the patterns having (K−1) length are disclosed for illustrative purposes, and any patterns having (K−1) length from among patterns having the K length, may be extracted.

For the convenience of description and better understanding of the present invention, it should be noted that the pattern having the above-mentioned characteristics is called a pseudo-orthogonal pattern, and the pattern characteristics are called "pseudo-orthogonal characteristics".

The above-mentioned pseudo-orthogonal pattern includes a Walsh code having the number of multiple antennas as an example of even-numbered length patterns. For another example, if the number of multi-antennas is 2, the pseudo-orthogonal pattern may be 1, 1, 1, 1, . . . and 1, −1, 1, −1 . . . . However, if the above-mentioned pseudo-orthogonal characteristics are satisfied, the pseudo-orthogonal pattern may also be other patterns for satisfying the above-mentioned pseudo-orthogonal characteristics, is not limited to the above-mentioned patterns, and may also be set to other examples as necessary.

In the meantime, the patterns for varying time-axis channel characteristics of Tx data may not be code signals having the above-mentioned pseudo-orthogonal characteristics, but weights for adjusting power ratios of each Tx data of each multi-antenna.

In this case, in association with the weights corresponding to the patterns varying the time-axis channel characteristics of the Tx data, the square values of the ratios of the individual weights may be equal to a Tx power ratio of each multi-antenna, and a detailed description thereof will be described later with reference to FIG. 6.

In the case of a method for transmitting data using the pseudo-orthogonal patterns, the reason why the Tx data pieces have the time diversity will hereinafter be described.

For example, if the number of multi-antennas is 2, the pseudo-orthogonal pattern is 1, 1, 1, 1, . . . , and 1, −1, 1, −1 . . . , and Tx data symbols to be transmitted on a time axis are $S_0$ and $S_1$, the data symbols $S_0$ and $S_1$ are adjacent to each other on the time axis, such that they have almost the same channel values (H), respectively. In this case, provided that a first antenna has a channel value H1 and a second antenna has a channel value H2, the data symbol $S_0$ transmitted over the first and second antennas has the channel value (H1+H2), and the data symbol S1 has the same channel value (H1+H2).

However, in the case of using the above-mentioned patterns according to the present invention, the symbol $S_0$ of the second antenna is multiplied by the value "1", and the symbol $S_1$ is multiplied by the value "−1", the channel value of the symbol $S_0$ is the value of H1+H2, and the channel value of the symbol $S_1$ is the value of H1−H2, such that two neighboring symbols on a time axis have different channel values.

In the above-mentioned example, a phase delay of 180° may exist in reception (Rx) data units due to the values 1 and −1, or a phase delay of 0° may exist in the Rx data units. The reception end may recognize the above-mentioned Rx data as signals from a single antenna having multiple paths (i.e., a multi-path), such that there is no need to use a complicated receiving method in the same manner as in the STC technique.

Figure 5:
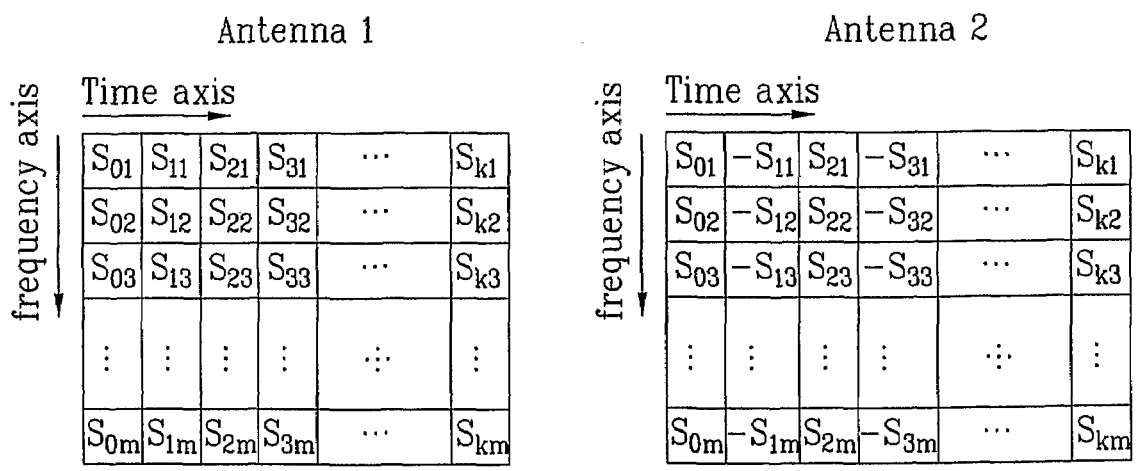
FIG. 5 is a conceptual diagram illustrating a data structure transmitted over a pattern capable of having time diversity in a Tx data stream according to a preferred embodiment of the present invention.

FIG. 5 is a conceptual diagram illustrating a data structure transmitted over a pattern capable of having time diversity in a Tx data stream according to a preferred embodiment of the present invention.

Referring to FIG. 5, a horizontal axis indicates a time axis, and a vertical axis indicates a frequency axis. The preferred embodiment of FIG. 5 shows an exemplary case in which two Tx antennas are used, and it is assumed that the pseudo-orthogonal codes are "1, 1, 1, 1, . . . " and "1, −1, 1, −1, . . . ".

According to the preferred embodiment of FIG. 3, the present invention shows a specific case in which several data pieces to be transmitted over multiple Tx antennas are equal to each other. In other words, data is transmitted over a single carrier.

However, the above-mentioned preferred embodiment of FIG. 3 is characterized in that several data units are transmitted according to a predetermined pattern in order to reduce a correlation between the data units on a time axis. In the case where different data units to be transmitted are transmitted over a multi-carrier on a frequency axis, the above-mentioned preferred embodiment can also be applied to the above-mentioned case.

FIG. 5 shows data transmitted over first and second antennas when the data is transmitted over m sub-carriers on a frequency axis. In this case, the Tx data has time diversity on a time axis due to an exemplary pseudo-orthogonal pattern (1, 1, 1, 1, . . . , and 1, −1, 1, −1, . . . ), and is discriminated according to sub-carriers on a frequency axis.

The communication system using the multi-carrier may be an OFDM communication system, and a Tx data stream may be an OFDM symbol sequence (also called an OFDM symbol stream).

In the meantime, differently from the above-mentioned preferred embodiment in which the patterns for varying time-axis channel characteristics of data to be transmitted are pseudo-orthogonal patterns, if the patterns for varying time-axis channel characteristics of data to be transmitted are weights selected according to power ratios of data to be transmitted over each multi-antenna, a detailed description thereof will hereinafter be described in detail.

FIG. 6 is a conceptual diagram illustrating a data structure having time diversity via a power-ratio pattern in a wireless communication multi-antenna system according to another preferred embodiment of the present invention.

Referring to FIG. 6, a horizontal axis indicates a time axis, and a vertical axis indicates a frequency axis. The preferred embodiment of FIG. 6 shows a specific case in which two Tx antennas are used. It is assumed that the patterns for assigning time diversity to Tx data of each antenna are indicative of weights selected according to Tx power ratios for each antenna instead of the pseudo-orthogonal pattern.

Generally, the power is equally assigned to the Tx data units of individual antennas. If a total Tx power is "1" in the case of using two Tx antennas as shown in FIG. 6, the power division of the ratio of 0.5:0.5 is applied to individual antennas at every Tx time unit.

However, according to the method for transmitting data according to the preferred embodiment of FIG. 6, a weight $P_{1i}$ is multiplied by Tx data of the first antenna in the i-th Tx time units (i.e., the i-th OFDM symbol unit, See each blank on the time axis of FIG. 6), and a weight $P_{2i}$ is multiplied by Tx data of the second antenna in the i-th Tx time units (i.e., the i-th OFDM symbol units), such that the power ratio of the above Tx data of the first and second antennas is set to $P_{1i}^2$ and $P_{2i}^2$. As a result, the present invention is more resistive to channel environments than the conventional scheme in which the power is equally divided to individual antennas, such that an error ratio can be reduced during the reception time.

As described above, the preferred embodiment of FIG. 6 assigns the weights ($P_{11}$, $P_{12}$, $P_{13}$, . . . ) to Tx datastreams of the first antenna, and assigns the weights ($P_{21}$, $P_{22}$, $P_{23}$, . . . ) to Tx data streams of the second antenna, such that the individual antennas have different Tx powers.

In this case, Tx data of the first antenna is multiplied by the weights ($P_{11}$, $P_{12}$, $P_{13}$, . . . ), such that the Tx data has diversity in a time domain. Tx data of the second antenna is multiplied by the weights ($P_{21}$, $P_{22}$, $P_{23}$, . . . ), such that the Tx data has diversity in a time domain.

Let the above mentioned technique as Power Balanced Diversity (PBD) technique, hereinafter. The PBD technique for acquiring a diversity gain by adjusting the power ratio for each antenna will hereinafter be described in detail.

The method for generating the weight patterns for use in the PBD technique will hereinafter be described in detail.

$$[P_{1,s} \ldots P_{Nt,s}]^T [S_n] \qquad \text{[Equation 2]}$$

In Equation 2, Tx data is created according to the PBD scheme when the individual Tx antennas transmit the same data $S_n$. In the Equation 2, $[P_{1,s} \ldots P_{Nt,s}]^T$ indicates a PBD matrix of the S-th OFDM symbol of the MIMO-OFDM signal based on Nt Tx antennas.

A frequency response of the S-th symbol in the reception end is represented by the following equation 3:

$$H_s(k) = H_{1,s}(k) P_{1,s} + \ldots + H_{Nt,s}(k) P_{Nt,s} \qquad \text{[Equation 3]}$$

In Equation 3, the weights ($P_{1,s}$, . . . , $P_{Nt,s}$) based on the power ratio are changed in time, such that the frequency response $H_s(K)$ is also changed in time.

In the meantime, in order to allow the statistical characteristic of the changed channel to satisfy the equation "$E[H_s(k)]=1$", it is preferable that the weight based on the power ratio satisfies the following conditions.

$$\text{norm}(P_s)=1, \text{ where } P_s = [P_{1,s} \ldots P_{Nt,s}]^T \qquad \text{[Equation 4]}$$

In Equation 4, if the vector set in which the norm of the weight vector according to the power ratio is "1" is configured, the channel response satisfies the equation $E[H_s(k)]=1$, such that it prevents the channel-response amplitude from being increased or lowered at a specific time according to the PBD scheme.

In the meantime, the above-mentioned vector set Ps generates N vector sets, each of which has the norm of vector as 1, according to below equation, stores the N vector sets, and may select proper vector sets from among the stored vector sets. A detailed description thereof will hereinafter be described in detail.

$$W_n = [\alpha_{1,n} \ldots \alpha_{Nt,n}]^T, \text{ where } \text{norm}(W_n)=1, n=1, \ldots, N \qquad \text{[Equation 5]}$$

An exemplary vector set from among the vector sets created as shown in Equation 5 may set the number (Nt) of antennas to "2". In this case, the following vector sets can be generated.

$$W_n = [\alpha \beta]^T, \text{ where } \alpha = \alpha \times \text{function}(\theta_n) + b, \beta = \sqrt{1-\alpha^2}, 0 < \alpha, \beta < 1 \quad \text{[Equation 6]}$$

In Equation 6, the term "function" has no special limitation, and may be set to a predetermined function, such that the value (Wn) may be selected according to the value (θn).

The Wn value may select the vector set (Ps) for adjusting the power ratio of the S-th OFDM symbol, and a detailed description thereof will hereinafter be described.

$$P_s = W_n, \text{ where } s: \text{OFDM\_symbol}, n: \text{Given\_number\_or\_number\_set} \quad \text{[Equation 7]}$$

As can be seen from Equation 7, only one vector set from among pre-created vector sets (Wn) is selected by a predetermined method, such that the selected vector can be applied to one or more symbols.

Therefore, the vector set Ps for adjusting the power ratio can be represented by the following equation 8:

$$P_s = [\alpha_{1,s} \ldots \alpha_{Nt,s}]^T \quad \text{[Equation 8]}$$

In the case of using the sin function to adjust the power ratio of Tx data of two antennas, the above-mentioned vector set for adjusting the power ratio can be represented by the following equation 9:

$$P_s = [\alpha_s \beta_s]^T, \text{ where } \alpha = \sqrt{\alpha \sin \theta_s + b}, \beta = \sqrt{1-\alpha^2}, 0 < \alpha, \beta < 1 \quad \text{[Equation 9]}$$

In Equation 9, the vector set (Ps) for adjusting the power ratio determines the weight applied to Tx data transmitted over each antenna by the θs value.

As can be seen from FIG. 6, if the PBD scheme for changing the power ratio of Tx data for each antenna is used as described above, the Tx data can acquire the diversity from the time domain. Namely, the time diversity of Tx data can be acquired according to the PBD scheme. However, if the above-mentioned PBD scheme is extended to the frequency domain, and the Tx power ratio of the Tx data for each frequency domain is changed to another power ratio, an additional frequency diversity (i.e., an additional frequency-domain diversity) can be acquired.

FIG. 7 is a conceptual diagram illustrating a data structure having time and frequency diversities via a power-ratio pattern in a wireless communication multi-antenna system according to a still another preferred embodiment of the present invention.

Compared with the example of FIG. 6 in which the pattern for changing the Tx power ratio in time is multiplied, the PBD scheme of FIG. 7 generates the pattern for changing the Tx power ratio in not only a time axis but also a frequency axis, maps the generated pattern to time- and frequency-direction data transmitted over the multi-antenna, and multiplies the pattern by the time- and frequency-direction data, such that the PBD scheme of FIG. 7 acquires the time and frequency diversities.

In more detail, FIG. 7 shows an exemplary PBD scheme for assigning time- and frequency-diversities to Tx data of two antennas. For example, FIG. 7 shows that the weight $P_{1ij}$ is multiplied by the i-th frequency unit, for example by the i-th subcarrier in the j-th time unit, for example in the j-th OFDM symbol of that sub-carrier of the first antenna, and the weight $P_{2ij}$ is multiplied by the i-th frequency unit, for example by the i-th subcarrier in the j-th time unit, for example in the j-th OFDM symbol of that sub-carrier of the second antenna. As a result, in the FIG. 7, the multiplied result changes the Tx power ratio in time and frequency domains, such that the Tx data may have the time and frequency diversities.

The mapping/multiplying process of the above-mentioned pattern for changing the power ratio to the OFDM symbols as Tx data for transmitting can be represented by the following Equation 10:

$$[P_{1,k,s} \ldots P_{Nt,k,s}]^T [S_n] \quad \text{[Equation 10]}$$

In more detail, Equation 10 indicates a method for transmitting the S-th OFDM symbol of the MIMO-OFDM signal according to the PBD scheme, and $[P_{1,k,s} \ldots P_{Nt,k,s}]^T$ indicates the PBD matrix for use in the above-mentioned method. In this case, individual Tx antennas transmit the same data Sn.

As described above, the above-mentioned preferred embodiment of the present invention can acquire the diversity in time and frequency domains according to the PBD scheme, thereby lowering an Rx error rate of the reception end.

In the meantime, the method for determining the power ratio of Tx data of the transmission end of the communication system is classified into an open-loop method which has no need to receive feedback information from the reception end, and a closed-loop method for employing feedback information received from the reception end.

The open-loop method does not use the feedback information depending on the channel-environment variation. Therefore, provided that the ratio of $P_{1i}$ to $P_{2i}$ and the ratio of $P_{1ij}$ to $P_{2ij}$ are set to different values at intervals of the Tx time unit as shown in FIG. 6, the above-mentioned ratios can be set to arbitrary values.

If the power-ratio information assigned to individual antennas is set to a specific value pre-recognized by the transmission and reception ends, the above-mentioned open-loop method can reduce the amount of overhead required for transmitting the power ratio and the weight information, such that it is considered to be a very desirable method.

In the meantime, according to the closed-loop method, the transmission end receives feedback information indicating a channel status from the reception end before setting the Tx power ratio. Therefore, the transmission end acquires channel-status information, and determines the power to be assigned to individual antennas on the basis of the channel-status information, such that it can transmit data with a lower error rate.

Figure 8:
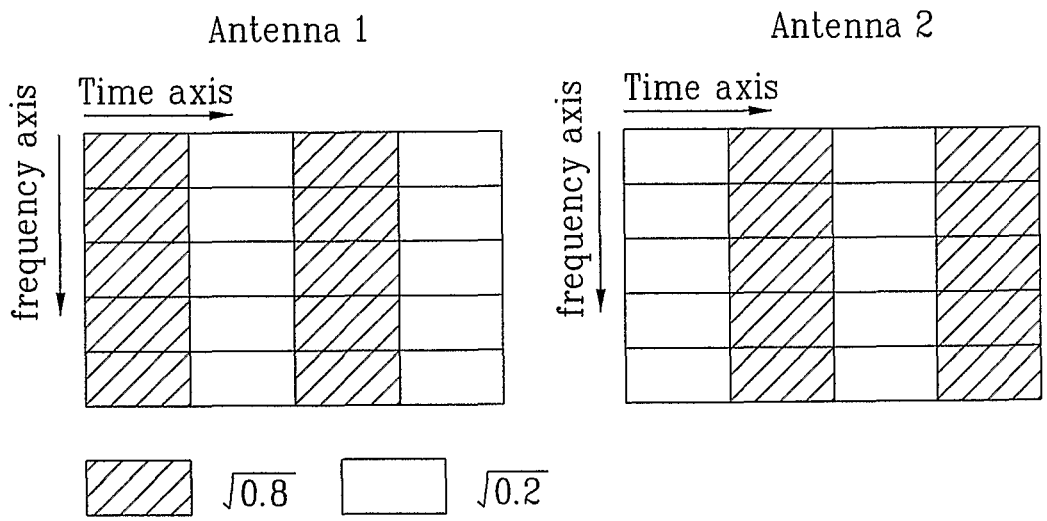
FIGS. 8~10 are conceptual diagrams illustrating a variation in Tx power-ratio on a time axis, frequency axis, and time-frequency axis of Tx data of each antenna according to power-ratio patterns according to the present invention.
Figure 9:
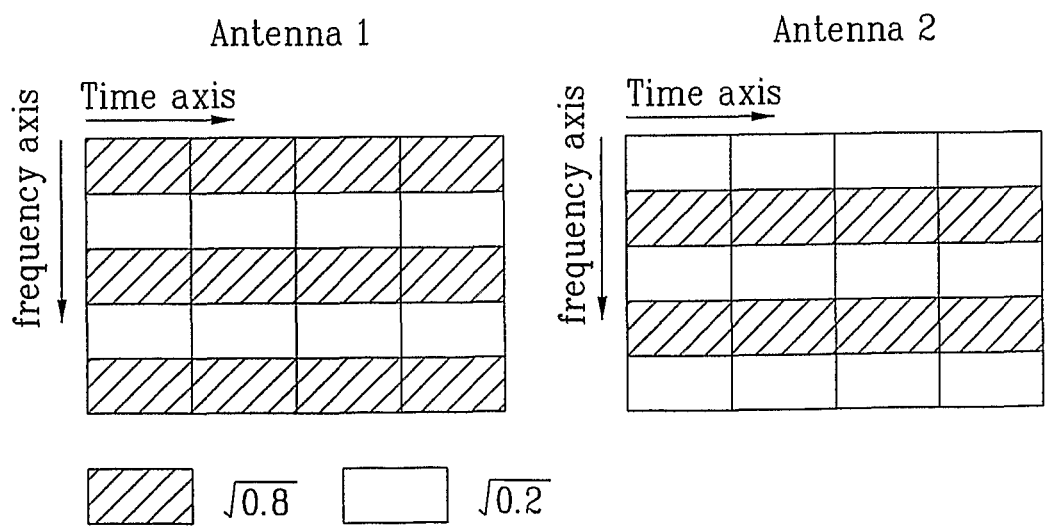
Figure 10:
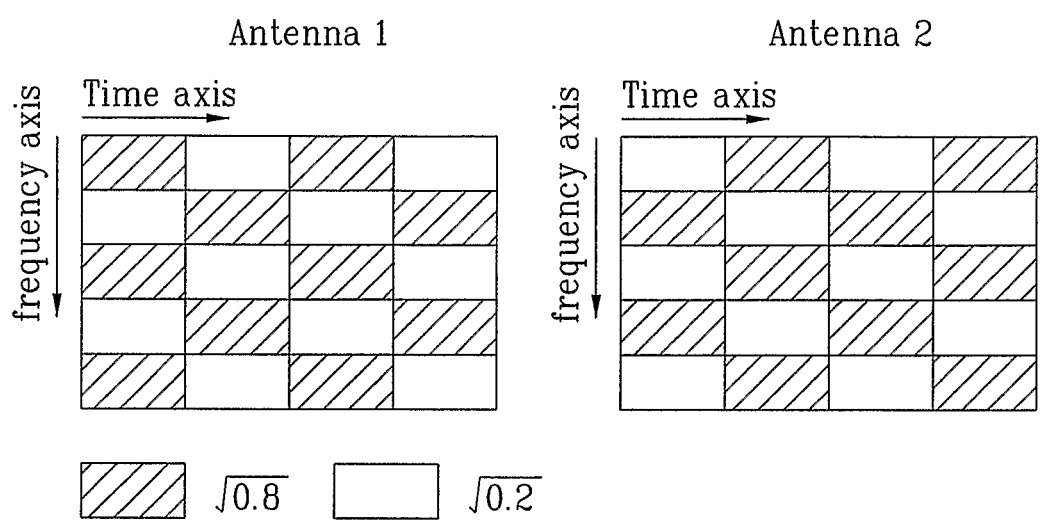

FIGS. 8~10 are conceptual diagrams illustrating a variation in Tx power-ratio on a time axis, frequency axis, and time-frequency axis of Tx data of each antenna according to power-ratio patterns according to the present invention.

Referring to FIGS. 8~10, the PBD method based on the above-mentioned preferred embodiments changes the power ratio in a time or frequency axis, and acquires a diversity gain. Representative application examples based on the above-mentioned PBD method are shown in FIGS. 8~10. In FIGS. 8~10, it is assumed that each oblique-lined part indicates the power ratio of $\sqrt{0.8}$, and a non-oblique part indicates the power ratio of $\sqrt{0.2}$.

In more detail, FIG. 8 shows a specific case in which the Tx power ratio is alternately changed to $\sqrt{0.8}$ and $\sqrt{0.2}$ in a time domain of Tx data for each antenna, such that the Tx data has time diversity.

FIG. 9 shows a specific case in which the Tx power ratio is alternately changed to $\sqrt{0.8}$ and $\sqrt{0.2}$ in a frequency domain of Tx data for each antenna, such that the Tx data has frequency diversity.

FIG. 10 shows a specific case in which the Tx power ratio of Tx data in latticed time and frequency domains is alternately changed to $\sqrt{0.8}$ and $\sqrt{0.2}$, such that the Tx data has time-frequency diversity.

The above-mentioned PBD method changes the power ratio of Tx data in time and/or frequency domain(s), such that it can acquire the time and/or frequency diversity.

A method for combining the above-mentioned PBD method with another method different from the CDD method will hereinafter be described in detail.

Figure 11:
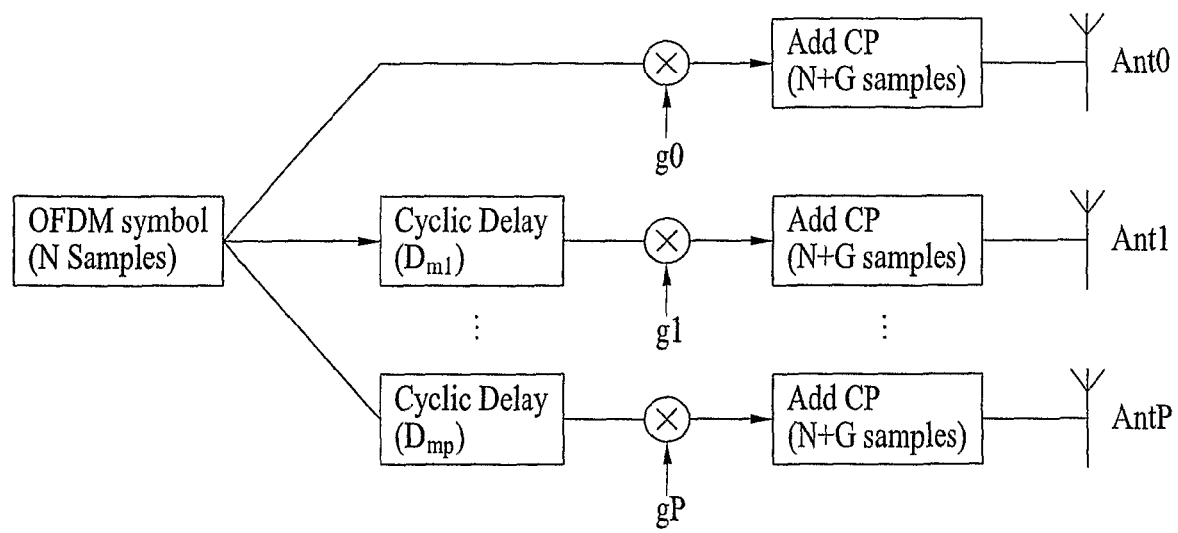
FIG. 11 is a conceptual diagram illustrating a transmitter for transmitting data using a CDD technique according to the present invention.

FIG. 11 is a conceptual diagram illustrating a transmitter for transmitting data using a CDD technique according to the present invention.

According to the CDD method, if the system including several Tx antennas transmits the OFDM symbol, different delays or magnitudes are assigned to each of all the antennas, such that the reception end can acquire the frequency diversity gain.

In FIG. 11, the Tx signal S(k) of the k-th sub-carrier of the N-FFT multi-carrier of the m-th antenna having the delay of Dm can be represented by the following equation 11:

$$S_m(k)=S(k)\cdot e^{-j2\pi k D_m/N} \quad \text{[Equation 11]}$$

As can be seen from Equation 11, the Tx signal generates the data structure of FIG. 12.

FIG. 12 is a structural diagram illustrating a data structure transmitted according to the CDD technique shown in FIG. 11 according to the present invention.

If the sub-carrier index (k) increases as shown in Equation 11, the phase of a Tx signal rotates in proportion to the sub-carrier index (k), a data structure in which an exponential function having different phases on a frequency axis is multiplied can be acquired as shown in FIG. 12, such that the frequency diversity can also be acquired.

If data is transmitted by the processing of Equation 11, a channel response of the Rx signal of the k-th sub-carrier can be represented by the following Equation 12:

$$H_{mc}(k)=H_{m0}(k)+H_{m1}(k)\cdot e^{-j2\pi k D_{m1}/N}+\ldots+H_{mp}(k)\cdot e^{-j2\pi k D_{mp}/N} \quad \text{[Equation 12]}$$

From the viewpoint of the time axis, the channel response is considered to be a single-antenna signal having a plurality of paths (i.e., a multipath) corresponding to the number of antennas, such that the reception end can easily decode the channel response.

However, the conventional art acquires only the diversity based on the frequency-axis channel characteristics, such that there is needed an improved technique for transmitting Tx data having time diversity.

Figure 13:
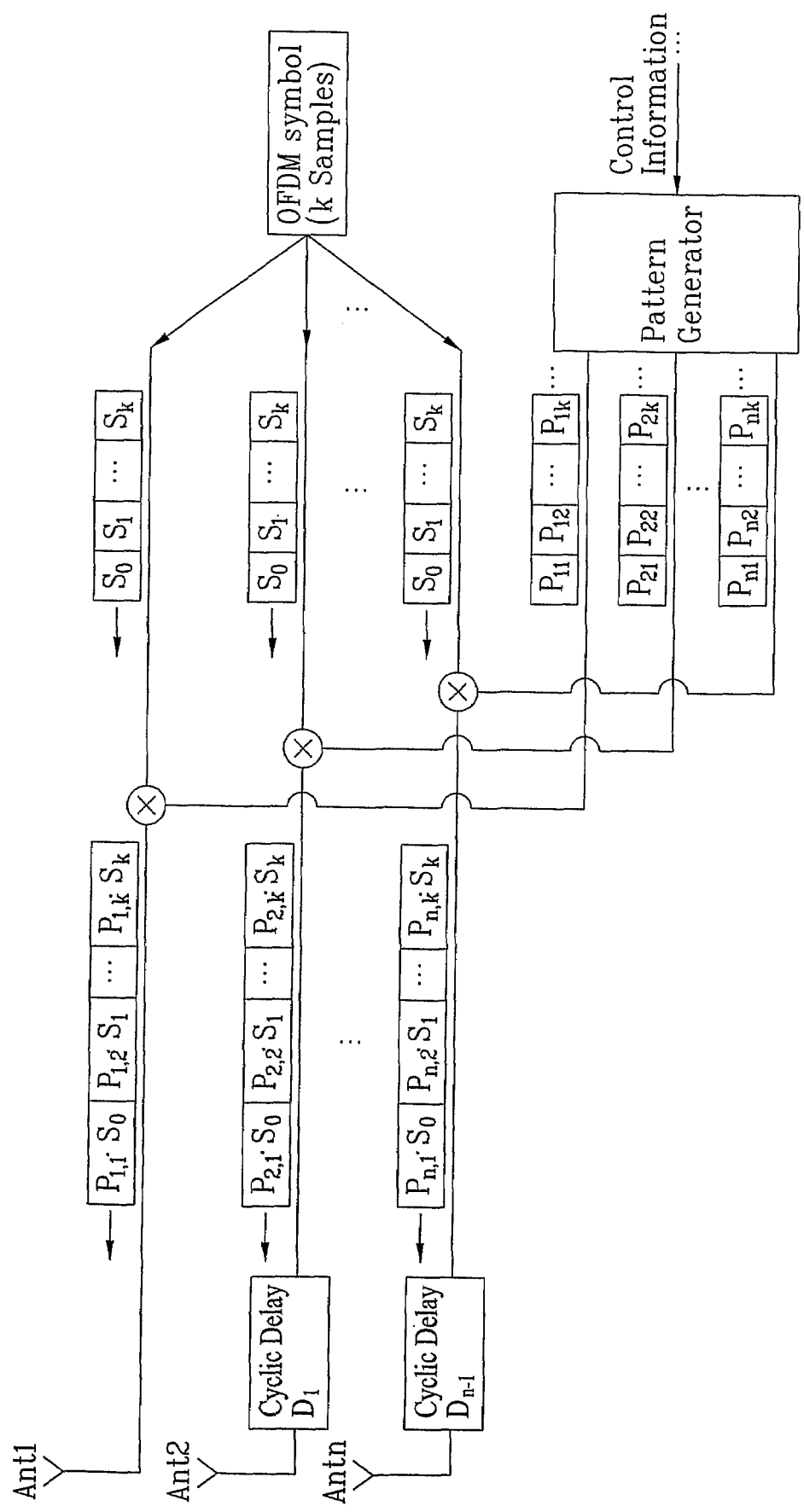
FIG. 13 is a conceptual diagram illustrating an apparatus for transmitting data having not only frequency diversity based on a CDD technique but also time diversity based on a power-ratio pattern in a wireless communication multi-antenna system according to a still another preferred embodiment of the present invention.

FIG. 13 is a conceptual diagram illustrating an apparatus for transmitting data having not only frequency diversity based on a CDD technique but also time diversity based on a power-ratio pattern in a wireless communication multi-antenna system according to a still another preferred embodiment of the present invention.

In more detail, the wireless communication multi-antenna system generates patterns ($P_{ij}$, where $1\leq i\leq n$, and $1\leq j\leq k$) for varying time-axis channel characteristics of Tx signals ($S_j$, where $1\leq j\leq k$) of each multi-antenna, such that it can transmit data having time diversity. In other words, the wireless communication multi-antenna system generates weight patterns to adjust the pseudo-orthogonal pattern or the power ratio.

The sequential signals of the above-mentioned patterns ($P_{ij}$) are multiplied by sequential data (Sj) of the time axis of Tx signals of the multi-antennas, such that the data streams ($P_{ij}\cdot S_j$) are generated.

The data streams ($P_{ij}\cdot S_j$) have the reduced correlation between neighboring symbols on a time axis according to pattern values, thereby acquiring the time diversity. Thereafter, the data streams having the time diversity are delayed by different magnitudes ($D_1 \sim D_{n-1}$) at individual antennas. Therefore, the wireless communication antenna system can transmit data having not only the frequency diversity but also the time diversity according to the CDD method. The delayed data streams are transmitted over the multi-antennas (Ant 1~Ant n).

The structure of the Tx data according to the present invention will hereinafter be described in detail.

FIG. 14 is a structural diagram illustrating transmission (Tx) data based on a pattern for assigning time diversity and other Tx data based on a CDD technique according to the present invention.

As can be seen from FIG. 14, the wireless communication multi-antenna system assigns the time diversity to Tx data of the patterns (e.g., $P_i$ and $P_i'$ of the i-th OFDM symbol) capable of assigning the time diversity to individual antennas. In associated with FIGS. 11 and 12, the wireless communication multi-antenna system changes Tx data according to the CDD method as shown in Equation 11, such that it acquires data having time-frequency diversity.

In the meantime, according to another preferred embodiment of the present invention, the above-mentioned CDD method shown in FIGS. 11 and 12 may assign frequency diversity and time diversity to data, and a detailed description thereof will hereinafter be described.

Figure 1:
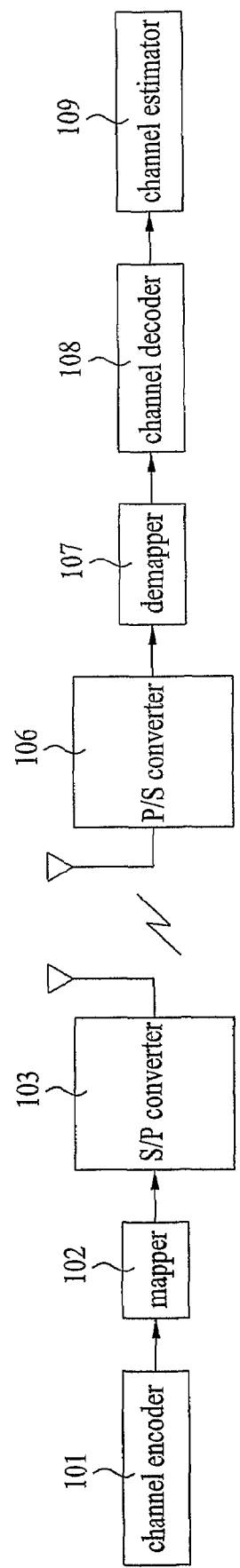
FIG. 1 is a block diagram illustrating an OFDM system including a single Tx/Rx antenna.
Figure 2:
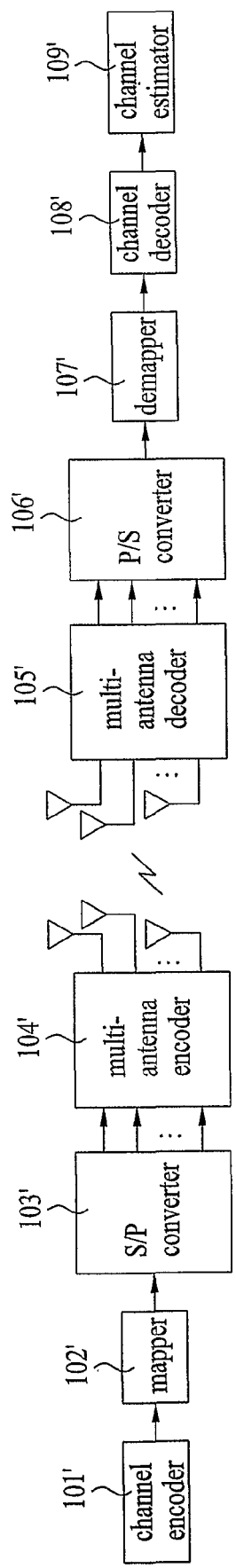
FIG. 2 is a block diagram illustrating an OFDM system including a multiple Tx/Rx antenna.

The wireless communication multi-antenna system multiplies an exponential function by each sub-carrier of the frequency domain, or may assign a predetermined delay to Tx data of a specific antenna in a time domain, and converts the multiplied or delayed result into frequency-domain data, such that it can acquire the frequency diversity using the CDD method as shown in FIG. 2.

If the wireless communication multi-antenna system assigns a predetermined delay to Tx data of a specific antenna in a frequency domain in order to implement the time diversity using the CDD method, converts the delayed result into time-domain data, and transmits the resultant data, then the overlapped signal occurs between Tx data units transmitted via different sub-carriers.

In order to recover the overlapped signal between Tx data, an additional device is required. Similar to the above-mentioned method for assigning the frequency diversity by delaying a time domain, if the additional device is not employed, the overlapped signal is recognized along with the multi-path signal at the same time, such that the wrong decoding may occur.

Therefore, in order to assign the time diversity instead of the frequency diversity using the CDD method, the method for multiplying an exponential function having a specific exponent by frequency-domain data is provided, where the specific exponent is proportional to the time, and has no connection with the frequency, to implement the time diversity.

The above-mentioned method can be represented by the following Equation 13:

$$S_m(k)=S(k)\cdot e^{j2\pi s D_m/N}, \text{ where } \lfloor t/Ts \rfloor \quad \text{[Equation 13]}$$

In Equation 13, "k" is indicative of a sub-carrier index in a frequency domain, "Ts" is indicative of a sampling time, and "s" is indicative an OFDM symbol index.

Equation 13 indicates a specific operation in which the same phase rotation occurs in the frequency domain during the OFDM symbol interval, and a frequency response based on a single sub-carrier is changed in time.

The concept of Equation 13 is equal to a process in which a predetermined phase rotation occurs in a frequency domain via an exponential function to implement the frequency diversity. In more detail, the phase rotation occurs in a time domain, and different channel characteristics occur in time, such that the diversity is acquired.

FIG. 15 is a structural diagram illustrating a data structure based on a CDD technique to assign diversity in a time-axis direction according to the present invention.

In other words, different phase delays occur in the time domain of Tx data as shown in Equation 13, such that the wireless communication multi-antenna system can acquire the time diversity, differently from the CDD method.

Needless to say, the wireless communication multi-antenna system may acquire only the time diversity as shown in FIG. 15. But, the wireless communication multi-antenna system according to the preferred embodiment of the present invention acquires the frequency diversity using the CDD method shown in FIG. 12, and simultaneously acquires the time diversity as shown in FIG. 15, such that it is obvious to those skilled in the art that the present invention can simultaneously acquire the time diversity and the frequency diversity.

Also, it should be noted that the above-mentioned CDD method may also be used along with the PBD method for acquiring the time and frequency diversities.

FIG. 16 is a conceptual diagram illustrating a method for simultaneously applying a pattern variation method based on a power ratio and a CDD technique capable of assigning time-frequency diversity according to the present invention.

As shown in FIGS. 12 and 15, the inventive CDD method, in which the first CDD method for acquiring the frequency diversity and the second CDD method for acquiring the time diversity are mixed with each other, may regularly increase the phase of Tx data on a frequency or time axis.

In associated with FIG. 7, the present invention performs mapping of the pattern capable of varying the Tx power ratio on time and frequency axes of Tx data, and multiplies the mapped pattern by data, such that it can acquire a diversity gain from all of the time axis and the frequency axis.

The above-mentioned method can be represented by the following equation 14:

$$\begin{bmatrix} P_{1,1,1} & 0 & 0 \\ 0 & \ddots & 0 \\ 0 & 0 & P_{Nt,k,s} \end{bmatrix} \begin{bmatrix} e^{j\theta_{1,1,1}} \\ \vdots \\ e^{j\theta_{Nt,k,s}} \end{bmatrix} [S_n]$$

[Equation 14]

In this case, "Nt" is indicative of the number of Tx antennas, "k" is indicative of a frequency-domain (sub-carrier) index, and "s" is indicative of a time-domain (OFDM symbol) index, such that the power ratio and the phase are changed in frequency and time.

In other words, the PBD matrix indicating patterns capable of varying the power ratio of Tx data in the time and frequency domains and the CDD matrix for varying the phase to assign the diversity to time and frequency domains are multiplied by the Tx data, such that an additional diversity gain occurs, such that the reception end can greatly decrease the error rate.

The combination of the above-mentioned methods to acquire the diversity is not limited to the above-mentioned examples, and can also be combined with other methods (e.g., Alamouti scheme) in various ways.

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

As apparent from the above description, the present invention make it possible to transmit data having time diversity using a system including a simple receiver structure.

Also, the present invention make it possible to transmit data not only with frequency diversity according to cyclic delay diversity (CDD) technique, also with time diversity.

Yet also, the present invention make it possible to acquire time-frequency diversity by generating a pattern capable of giving time diversity to Tx data in not only a time domain but also in a frequency domain, and make a cyclic delay diversity (CDD) technique to have diversity in both frequency- and time-areas.

By doing the above and combination thereof, the present invention make possible to decrease an error rate of the reception end.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for transmitting data in a wireless communication multi-antenna system, the method comprising:
generating time and frequency-axes patterns for varying time and frequency-axes channel characteristics of transmission signals of each multi-antenna;
mapping the time and frequency-axes patterns to time and frequency-axes data of the transmission signals of the multi-antennas, multiplying the time and frequency-axes patterns by the time and frequency-axes data, and generating a data stream having time-frequency diversity;
multiplying an exponential function having a specific exponent by the data stream having the time-frequency diversity, and generating a data stream having an additional time diversity; and
transmitting the generated data stream,
wherein the specific exponent is proportional to time and has no connection with a frequency.

2. The method according to claim 1, wherein when extracting patterns from the patterns for varying the time-axis channel characteristics, and when the extracted patterns have an maximum even length equal to or less than a length of the patterns, the extracted patterns are composed of orthogonal codes orthogonal to each other.

3. The method according to claim 2, wherein the patterns for varying the time-axis channel characteristics are a Walsh codes, and a number of the Walsh codes corresponds to a number of multi-antennas.

4. The method according to claim 2, wherein the patterns for varying the time-axis channel characteristics are 1, 1, 1, 1, . . . and 1, −1, 1, −1 . . . , when a number of multi-antennas is 2.

5. The method according to claim 1, wherein the patterns for varying the time-axis channel characteristics are selected to have ratios according to a transmission power ratio assigned to each of the multi-antennas, at every transmission time unit.

6. The method according to claim 1, wherein the patterns for varying the time and frequency-axes channel characteristics are selected to have ratios according to a transmission power ratio assigned to each of the multi-antennas, a transmission power ration assigned to each of data to be transmitted through frequency axis, at every transmission time unit.

7. The method according to claim 6, wherein a norm value of the patterns for varying the time and frequency-axes channel characteristics in specific frequency resource units is 1.

8. The method according to claim 6, further comprising:
processing the data stream having the time-frequency diversity generated by the mapping to have different phase delays in a frequency domain, and generating a data stream having an additional frequency diversity.

9. An apparatus for transmitting data in a wireless communication multi-antenna system, the apparatus comprising:
a pattern generator for generating time and frequency-axes patterns to vary time and frequency-axes channel characteristics of transmission signals of each multi-antenna;
a multiplier for mapping the time and frequency-axes patterns to time and frequency-axes data of the transmission signals of the multi-antennas, multiplying the time and frequency-axes patterns by the time and frequency-axes data, generating a data stream having time-frequency diversity, and multiplying an exponential function having a specific exponent by the data stream having the time-frequency diversity, and generating a data stream having an additional time diversity; and
a transmitter for transmitting the data stream generated by the multiplier,
wherein the specific exponent is proportional to time and has no connection with a frequency.

* * * * *

UNITED STATES PATENT AND TRADEMARK OFFICE
CERTIFICATE OF CORRECTION

| | | |
|---|---|---|
| PATENT NO. | : 8,451,945 B2 | Page 1 of 1 |
| APPLICATION NO. | : 12/373515 | |
| DATED | : May 28, 2013 | |
| INVENTOR(S) | : Hyun Soo Ko, Bin Chul Ihm and Jin Young Chun | |

It is certified that error appears in the above-identified patent and that said Letters Patent is hereby corrected as shown below:

Title Page: Item (22) PCT Filed: delete "Jul. 13, 2007" and insert -- Jul. 11, 2007 --.

Signed and Sealed this
Twenty-ninth Day of October, 2013

Teresa Stanek Rea
*Deputy Director of the United States Patent and Trademark Office*